Patented Sept. 10, 1935

2,014,083

UNITED STATES PATENT OFFICE

2,014,083
ALLOY
John Johnson, Manville, N. J.

No Drawing. Application April 3, 1935,
Serial No. 14,441

2 Claims. (Cl. 75—1)

This invention relates, generally, to alloys, and the invention has reference, more particularly, to a novel alloy that is especially valuable for brazing purposes, the said alloy comprising essentially a solidified solution of silver, copper, cadmium and zinc.

Silver alloys or solders consisting of silver, zinc and copper have been widely used in the past although such alloys have not been satisfactory because in order to obtain an alloy of requisite strength for brazing or hard soldering purposes the percentage of zinc must be kept low, but those alloys having small percentage of zinc are open to the objection that their melting points are so high that objects to be united by them must be heated to a temperature that is apt to damage them. Thus, silver alloys having substantial percentages of zinc have undesirable physical properties and those having low percentages of zinc are harmful in use. Cadmium has been used in combination with silver, copper and zinc, but alloys of this nature heretofore produced are objectionable in that the substantial percentages of zinc used gives the alloys undesirable physical properties including brittleness and lack of strength. Also, the relatively large percentage of silver used in these alloys heretofore produced gives them an exceedingly high melting point which is objectionable.

The principal object of the present invention is to provide a novel alloy or composition metal having substantially similar percentages of silver, copper and cadmium serving as the principal ingredients, there being included a relatively small percentage of zinc in the alloy to enhance the flowability of the same in use and to enable the alloy to more readily wet the surfaces of the objects being adhered by the same.

Another object of the present invention lies in the provision of a novel alloy of the above character that is exceedingly strong, has a fairly low melting point and flows freely so that it is adapted to be conveniently employed for uniting objects without the probability of damage to them, the said alloy having excellent physical properties enabling it to produce strong, permanent joints, and having a wide range of utility so that the same may be employed for brazing steel, iron and a large variety of non-ferrous metals and alloys.

Other objects of this invention, not at this time more particularly enumerated, will be clearly understood as the following detailed description proceeds.

The novel alloy of this invention contains considerably less silver than heretofore used in such alloys, thereby lowering the melting point and improving the strength of the alloy, and only sufficient zinc is contained in the alloy to insure its ready flowability in use. The range of the ingredients used is substantially as follows in the percentages given by weight:

| | Percent |
|---|---|
| Silver | 30 to 35 |
| Copper | 30 to 32 |
| Cadmium | 30 to 38 |
| Zinc | 2 to 5 |

A specific formula for an alloy of this invention is given as follows:

| | Percent |
|---|---|
| Silver | 33 |
| Copper | 30 |
| Cadmium | 35 |
| Zinc | 2 |

An alloy within the range given melts at a fairly low temperature and is free flowing owing to the presence of the small quantity of zinc and can be extensively used for brazing without the liability of the articles joined being damaged. This new alloy has great strength and toughness and may be welded or worked cold, the physical properties of the alloy being most appropriate for a brazing alloy.

The relatively large percentage of cadmium used in the alloy not only serves to reduce the melting point of the alloy, but also serves to render the same corrosion proof.

The alloy is ordinarily employed with a flux such as borax although a flux is not necessary if the surfaces to be joined are clean and heated to the melting temperature of the alloy.

What is claimed is:

1. An alloy of the character described which consists of silver from about 30 to 35%, copper from about 30 to 32%, cadmium from about 30 to 38% and zinc from about 2 to 5%.

2. An alloy of the character described which consists of about 33% silver, about 30% copper, about 35% cadmium and about 2% zinc.

JOHN JOHNSON.